United States Patent
Prinz et al.

(10) Patent No.: US 8,171,779 B2
(45) Date of Patent: May 8, 2012

(54) METHOD AND DEVICE FOR MONITORING AN OZONE-OXYGEN CONVERSION MEANS, ESPECIALLY FOR VEHICLES

(75) Inventors: Oliver Prinz, Ingolstadt (DE); Thierry Delcour, München (DE)

(73) Assignee: Audi, AG, Ingolstadt (DE)

( * ) Notice: Subject to any disclaimer, the term of this patent is extended or adjusted under 35 U.S.C. 154(b) by 263 days.

(21) Appl. No.: 12/567,962

(22) Filed: Sep. 28, 2009

(65) Prior Publication Data
US 2010/0139381 A1    Jun. 10, 2010

(30) Foreign Application Priority Data
Sep. 27, 2008   (DE) .......................... 10 2008 049 389

(51) Int. Cl.
*G01M 17/00*    (2006.01)

(52) U.S. Cl. .................................................. 73/114.68

(58) Field of Classification Search ............... 73/114.55, 73/114.56, 114.75, 114.68
See application file for complete search history.

(56) References Cited

U.S. PATENT DOCUMENTS

| | | | |
|---|---|---|---|
| 6,681,619 B2 * | 1/2004 | Alleving et al. | ........... 73/114.68 |
| 6,695,473 B2 | 2/2004 | Unger et al. | |
| 7,038,579 B2 * | 5/2006 | Hosoe et al. | ................... 340/439 |
| 2004/0168790 A1 * | 9/2004 | Hosoe et al. | ................. 165/11.1 |
| 2006/0078464 A1 | 4/2006 | Alleving et al. | |
| 2008/0021631 A1 | 1/2008 | Busch et al. | |

FOREIGN PATENT DOCUMENTS

| | | |
|---|---|---|
| DE | 102004015044 A1 | 10/2005 |
| EP | 1416133 A1 | 5/2004 |
| EP | 1416133 B1 | 11/2008 |

* cited by examiner

*Primary Examiner* — Eric S McCall
(74) *Attorney, Agent, or Firm* — Novak Druce & Quigg LLP

(57) ABSTRACT

A method of monitoring a heat exchanger of a vehicle, coated with an ozone-oxygen conversion material, including detecting the heat exchange medium temperature (tka) and heat exchange temperature (tprem) and plotting the values as a function of time, determining the area value (atka) of the heat exchange medium temperature, comparing the value of the heat exchange medium temperature with a setpoint value, repeating the foregoing steps if the sensed value is negative relative to the setpoint value, devising a quotient of the area values of such temperature, comparing the devised quotient with a defined setpoint range ($R_A$) and determining whether such devised quotient falls within or without such defined setpoint range.

17 Claims, 4 Drawing Sheets

Figure 1:
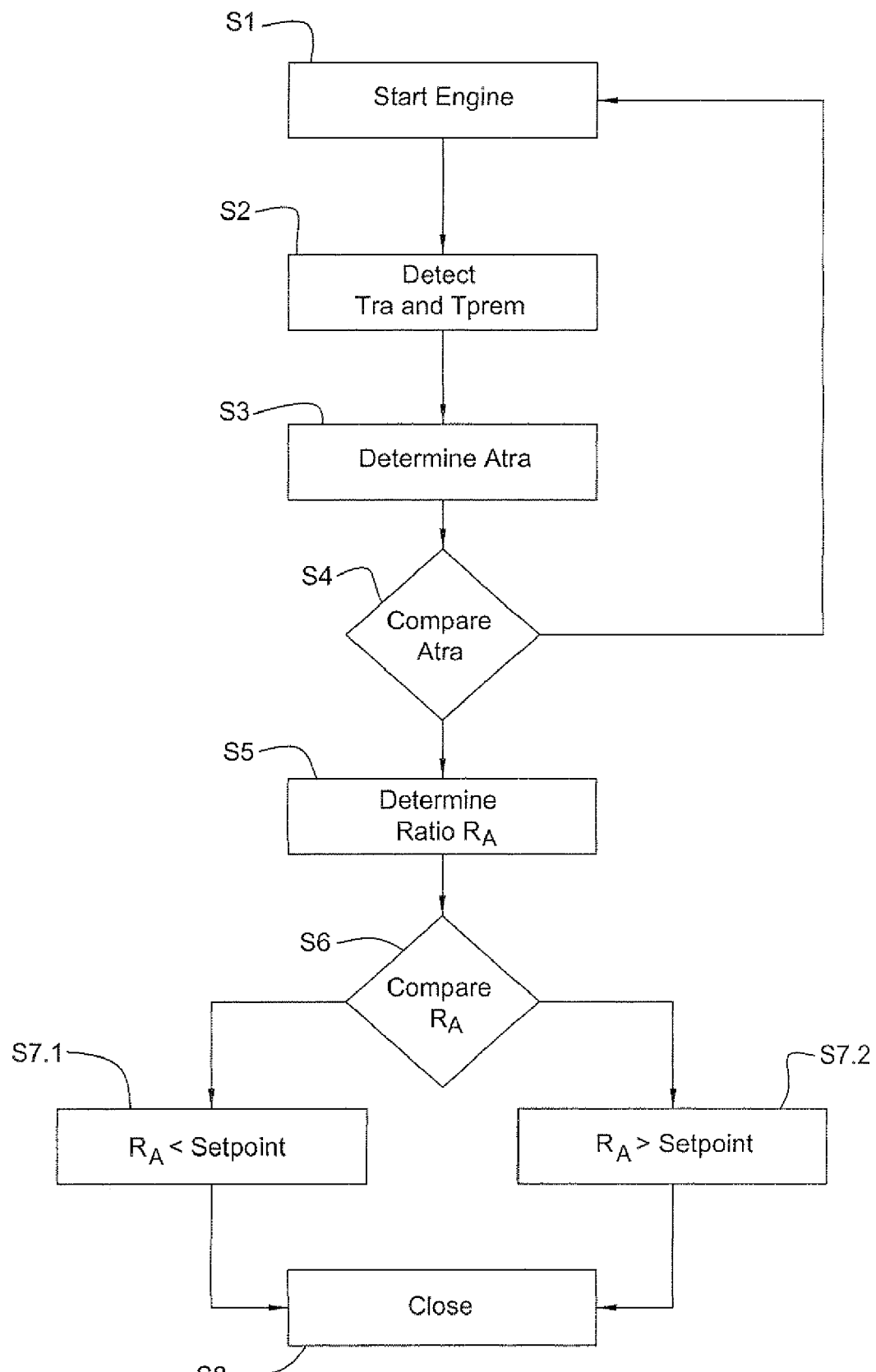

METHOD AND DEVICE FOR MONITORING AN OZONE-OXYGEN CONVERSION MEANS, ESPECIALLY FOR VEHICLES

The invention relates to a method and device for monitoring the operation of an ozone-oxygen conversion means, especially for vehicles, and an electronic device for monitoring the operation of an ozone-oxygen conversion means, according to the features specified in the preambles of the respective independent claims.

It is generally known that vehicle emissions in recent years have been increasingly subject to regulatory requirements worldwide and have had to satisfy higher requirements from year to year. Until recently these efforts have been directed mainly at exhaust gas clean-up and have led to the development of controlled catalytic converter technology in the exhaust gas line of internal combustion engines.

For some years there has additionally been emphasis on having the ozone contained in the ambient air at ground level converted into oxygen. Ozone is toxic to human health, and, also its proportion in the higher layers of the earth's atmosphere has the known harmful effect of transmitting solar UV radiation unhindered. Legally guided development in this connection follows the path of passing on to the consumer material incentives in the form of higher or lower exhaust gas taxes tied to ozone-oxygen conversion. Another regulatory requirement moreover calls for the emission reducing means to be detected by onboard diagnosis in the vehicle. This dictates the objective of equipping a vehicle such that while driving it converts the harmful ozone into normal oxygen and for this purpose uses the inherent heat energy of the internal combustion engine which arises by design and which is to be dissipated.

For these reasons, vehicles are being increasingly equipped with a so-called DOR (Direct Ozone Reduction) cooler (for example, PremAIR® cooler). This catalytically coated cooler converts the ozone $O_3$ which occurs at ground level and which is contained in the air flowing through it into oxygen $O_2$ by the heat energy of a radiator. The prerequisite for the relief regulated by law is the reliable monitoring of the temperature sensor which is referred to as the DOR sensor for its functionality during vehicle operation and thus protection against manipulation or of the action of the catalytically coated cooler which weakens due to aging processes, for example.

A DOR sensor monitors, for example, the correct, original installation site of the cooler and its functionality using the evaluation of the temperature characteristics of the sensor. This takes place in known applications by evaluating the determined temperature gradients, as described in US2008021631A. A temperature gradient is a change of temperature over time at a site, over an area, or in a volume. If the cooler-sensor package is installed at the correct original installation site and the system is serviceable, under certain circumstances temperature gradients arise which can be evaluated and which lie within expected temperature gradient boundaries.

Furthermore, US2006/0078464 A1 discloses a structure in which proper installation of a DOR cooler is monitored by the coolant temperature upstream from a thermostat and the coolant temperature at the cooler inlet being determined in a cold start. The two temperature characteristics are evaluated with respect to the individual temperatures at certain instants and it is established, for example, in conjunction with stipulated threshold values, whether installation is proper or not.

U.S. Pat. No. 6,695,473 B2 discloses such a pure temperature characteristic comparison for a structure which has a DOR cooler. Specifically, here at the beginning of a cold start a sudden change in the temperature of the coolant at the coolant inlet which occurs at a certain time is detected. If this sudden temperature change occurs and the further temperature characteristic then approaches the temperature characteristic of the engine coolant, proper installation is diagnosed and a validity signal is generated.

EP 1 416 133 B1 discloses a heat exchanger-detector which has a sensor that detects a residual amount of catalyst coating. Furthermore, there is a control unit which, based on detection of the sensor, generates an alarm in which the position of detection of the sensor is determined according to the temperature characteristics of the heat exchanger. The position of detection of the sensor, in addition to the temperature characteristic of the heat exchanger, can be determined according to a flow rate of the air passing through the heat exchanger. Specifically, the position of detection of the sensor is determined such that detection takes place when an amount of breakdown of the chemical substance due to the action of the catalyst coating becomes less than a value which is declared in an application for certification of the breakdown performance.

Finally, DE 10 2004 015 044 A1 discloses a method and a device for determining the presence of a prescribed heat exchanger in which in operation of the vehicle the temperature of a heat exchanger agent together with other operating-relevant parameters is observed. Specifically, an expected temperature gradient of the temperature of the heat exchanger agent over time is then determined in order to be able to draw the conclusion of prescribed installation.

Conversely, the object of the invention is to devise a method and device for monitoring the operation of an ozone-oxygen conversion means, especially for monitoring of the installation site of a heat exchanger and/or a temperature sensor (DOR sensor) of an ozone-oxygen conversion means, especially for vehicles, with which the functionality of a DOR means with a catalytically coated cooler can be easily and reliably detected in a lower temperature range with reduced technical effort and with which manipulations on the DOR means can be largely precluded.

This object is achieved with the method with the features of claim 1. With respect to the device this object is achieved with the features of claim 11 and with respect to the electronic device this object is achieved with the features of claim 17. Advantageous configurations are the subject matter of the dependent claims referenced thereto.

According to claim 1, a method is proposed for monitoring the operation of an ozone-oxygen conversion means, especially for monitoring of the installation site of a heat exchanger and/or a temperature sensor (DOR sensor) of an ozone-oxygen conversion means, especially for vehicles, the ozone-oxygen conversion means having at least one catalytically coated heat exchanger through or around which air flows and through which a heat exchange medium flows, with at least one temperature sensor (DOR sensor) located on or in the heat exchanger for detecting the heat exchanger temperature, in particular for detecting the surface temperature of the heat exchanger. Furthermore, for a defined time interval the temperature characteristics at the heat exchanger outlet and on the DOR sensor are determined and are thus set into a relation to one another and/or to defined comparison quantities and/or values such that evaluation of the operation of the ozone-oxygen conversion means and/or of the installation site of the catalytically coated heat exchanger and/or of the DOR sensor can be carried out.

As specified in the invention, according to a first sequence of steps or number of steps:

a) the temperature of the heat exchange medium at the outlet from the heat exchanger is detected using a temperature sensor as a first time-referenced characteristic curve,
b) the temperature of the DOR sensor is detected as a second time-referenced characteristic curve,
c) the detected temperature of the heat exchange medium is brought into a given relation with the detected temperature of the DOR sensor to one another, this given relation corresponding to the formation of the time-referenced difference in area between the first and second characteristic curve.

Furthermore, in a second sequence of steps which proceeds preferably parallel to the first d) the time-referenced value of the area below the first time-referenced characteristic curve is determined,
e) the determined area value is compared to a defined and/or definable first setpoint range, and
f) a validity signal or invalidity signal is generated depending on this comparison.

Then, in a third sequence of steps g) when the area value is invalid, there is branching to the start of the process, or,
h) if the area value is valid, a relation between the difference of the areas of the two detected characteristic curves and the first area value is formed in order to detect a system fault or to generate a validity signal.

With this evaluation of the areas under the temperature characteristics according to the invention, it becomes possible to reliably satisfy the regulatory requirements also in the aforementioned difficult operating situations. Diagnosis of the functionality of the DOR system can, moreover, be activated at lower temperatures which lie in a temperature range which are checked for feasibility. Moreover, the conditions under which the diagnosis can be carried out are not as difficult to satisfy as in a conventional diagnosis process.

Preferably, a quotient is formed from the two values as the relation, the determined quotient being compared to a defined and/or definable second setpoint range. If the determined quotient is invalid, a system fault is recognized or, if the determined quotient is valid, a validity signal is generated.

According to one preferred embodiment of this invention the first and second sequence of steps are carried out over a defined or definable time interval.

Preferably, after executing the third sequence of steps execution of the method is begun again. Alternatively, the method can be re-started at regular time intervals.

The determined temperature values of at least one of the time-referenced characteristic curves are buffered in an electronic device in another preferred configuration of the method according to the invention.

At least one of the process steps is executed preferably using at least one coded instruction and they are processed in an electronic device. In this way the greatest flexibility of the development effort can be achieved.

According to another preferred configuration of the method according to this invention, at least the first or second time-referenced characteristic curve is formed as a temperature gradient.

To form at least one area value or the difference in areas between the first and second characteristic curve preferably at least one electronic integrator and/or a differentiator is used.

In another preferred configuration of this invention, to form the area value and/or the difference in areas between the first and second characteristic curve, a microprocessor-based integrator implemented by coded computation instructions and/or a differentiator is used. A microprocessor-based embodiment is also advantageous in this case with reference to flexible and economical development and production.

The temperature of the heat exchange medium at the outlet from the heat exchanger is preferably detected starting from a temperature of approximately 60 degrees Celsius that is reached as a first time-referenced characteristic curve. The method according to the invention can thus be used at lower temperatures.

According to claim 11, the device according to the invention has at least one detection means and/or comparison means and/or evaluation means, by means of which for a defined time interval the temperature characteristics can be detected at the heat exchanger outlet and on the DOR sensor and can be set into a relation to one another and/or to given comparison quantities and/or values for evaluation of the operation of the ozone-oxygen conversion means and/or of the installation site of the catalytically coated heat exchanger and/or of the DOR sensor. As specified in the invention, according to one specific embodiment, in this connection there is a first temperature sensor for detecting the temperature of the heat exchange medium at the outlet from the heat exchanger, furthermore there being at least one means for detecting a first time characteristic of the temperature of the heat exchange medium and a second time characteristic of the temperature of the DOR sensor. Moreover, there is at least one means for forming the difference in the areas between the first and second characteristic curve. In addition, there is at least one means for forming the value of the area below the first time characteristic of the temperature of the heat exchange medium. This results in the advantages named above in conjunction with the management of the method. Furthermore, there is preferably at least one means for recording and keeping ready a defined and/or definable setpoint range of the area value and at least one means for comparing the determined area value to the defined and/or definable setpoint range. Finally, there is at least one means for forming a relation between the area difference of the two detected characteristic curves and the area value, the relation preferably being made as a quotient of the two values.

The device or ozone-oxygen conversion means according to the invention for forming the area value or the area difference between the first and second characteristic curve has preferably at least one electronic integrator and/or a differentiator.

Another preferred configuration of the device according to the invention for forming the area value or the area difference between the first and second characteristic curve has a microprocessor-based integrator implemented by coded computation instructions and/or a differentiator.

The heat exchange medium is preferably a water mixture, a cooling medium with or without antifreeze, oil or a gas mixture. The heat exchanger is preferably an engine radiator, an oil cooler and/or the condenser of an air conditioning system present in the vehicle.

According to another hardware aspect of this invention, the object according to the invention is achieved by an electronic device for monitoring the operation of an ozone-oxygen conversion system with at least one means for executing at least one step of the method according to one above described configuration.

The invention is detailed below using drawings.

Figure 2:
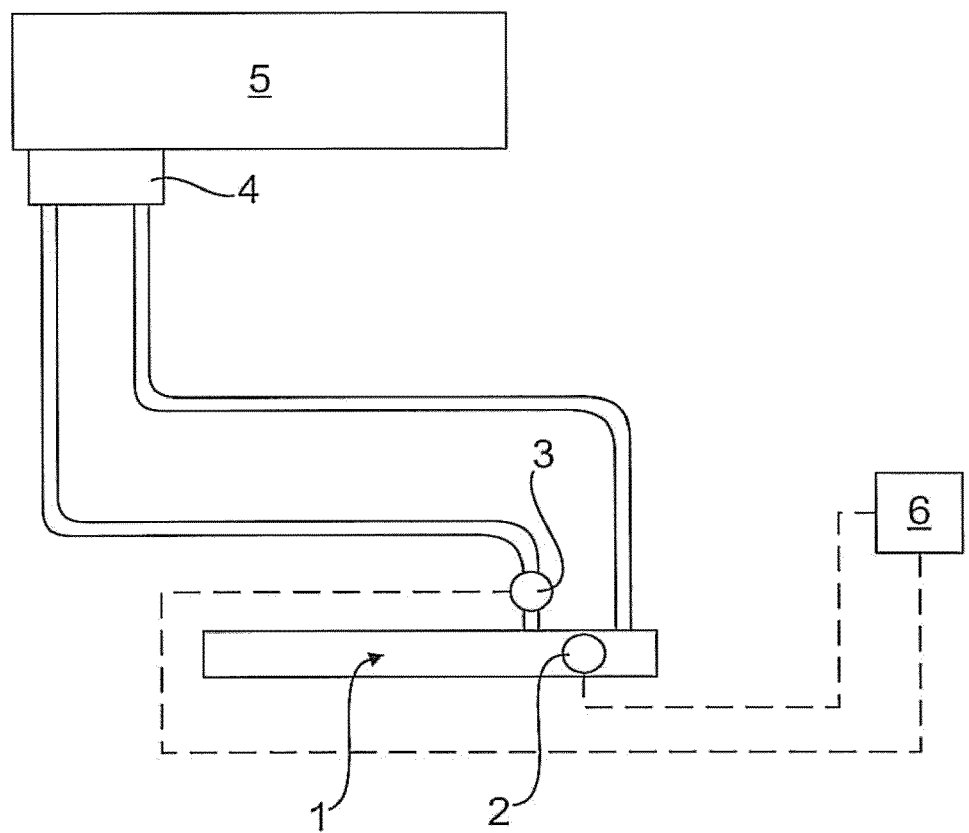
Figure 3A:
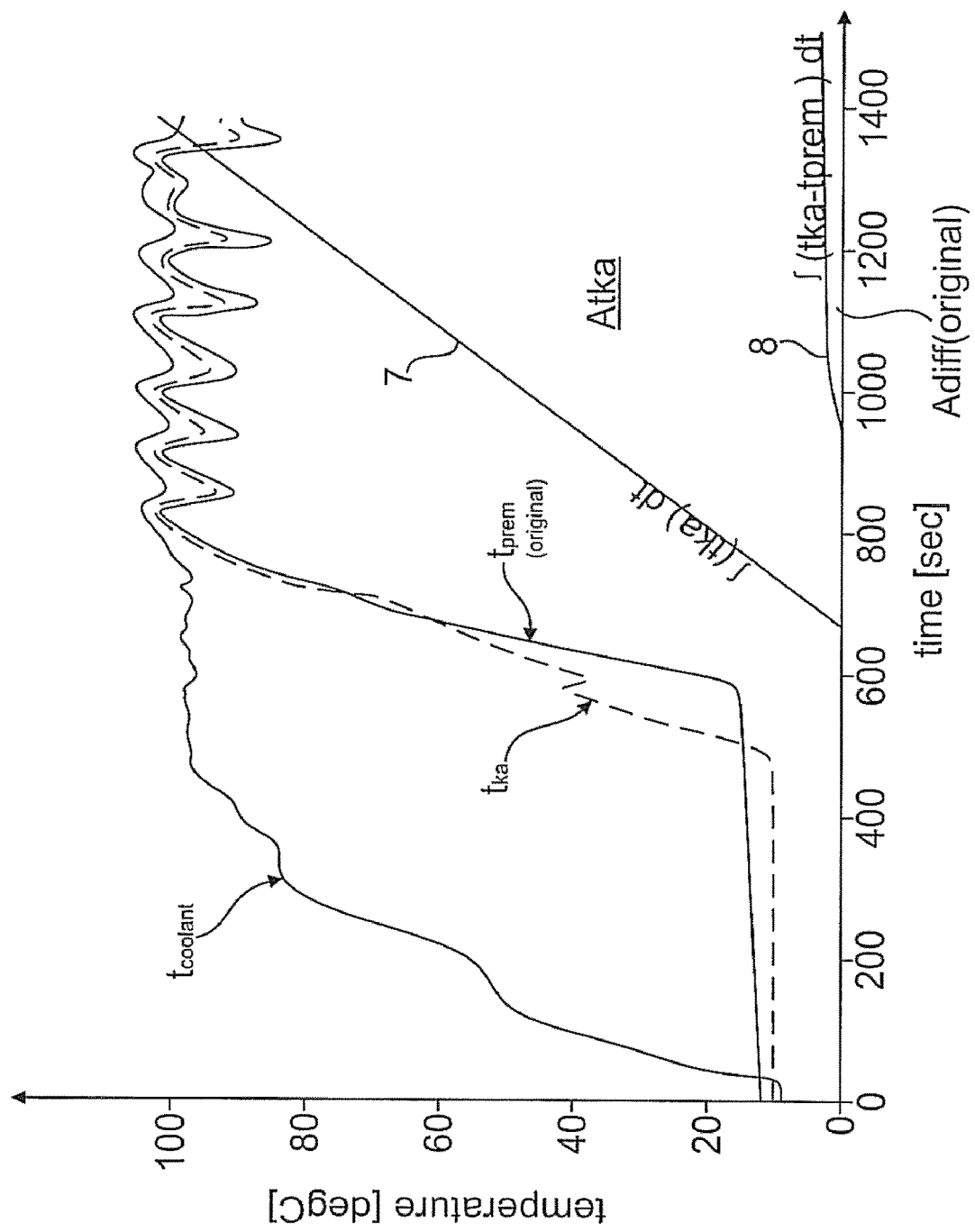
Figure 3B:
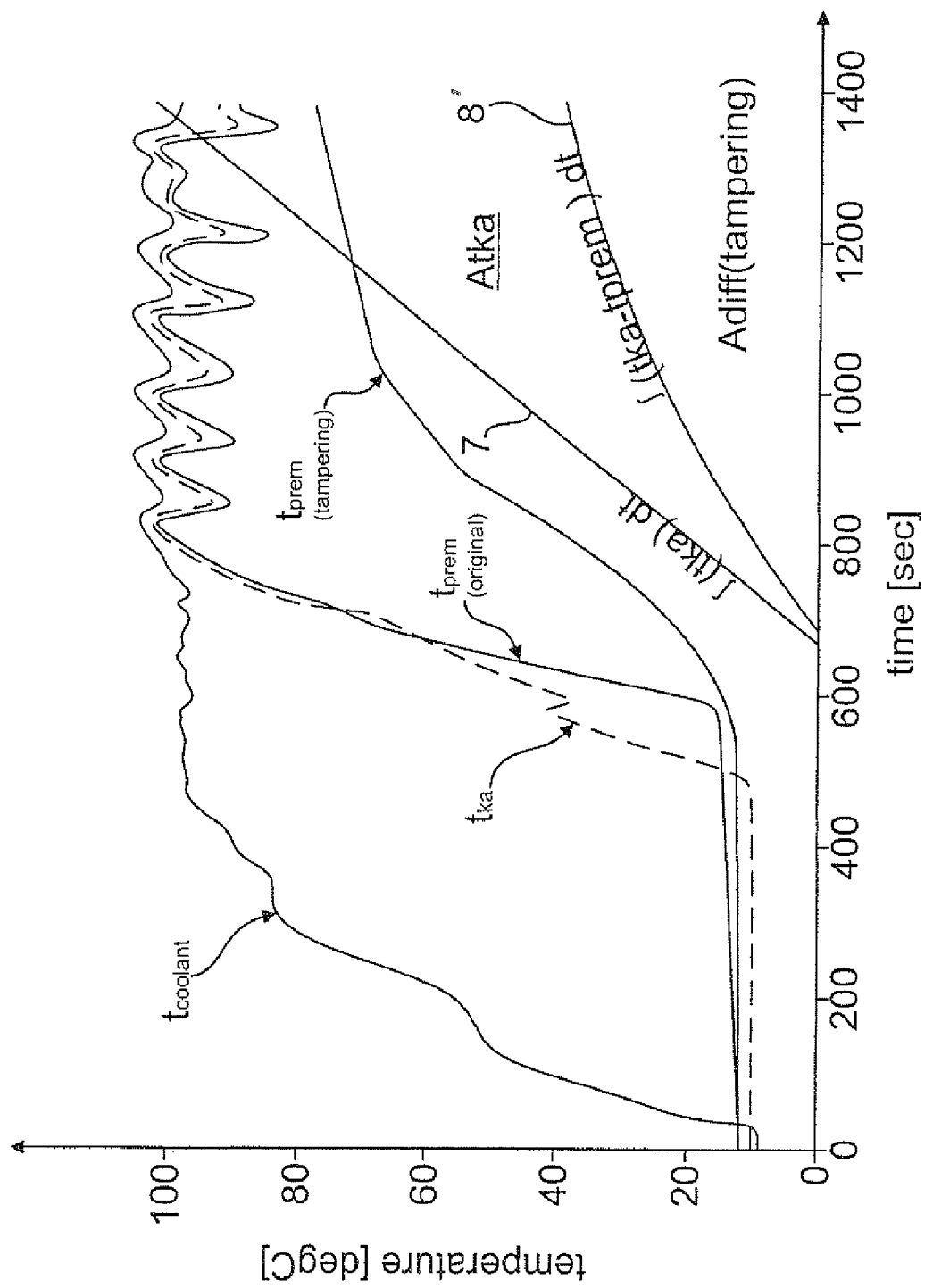

FIG. 1 schematically shows a flow chart of the preferred process management according to the invention, FIG. 2 shows only highly schematically and by way of example an internal combustion engine with a device according to the invention for executing the method for monitoring the operation of an ozone-oxygen conversion means, FIG. 3a, b show different area values in the temperature-time diagram for proper operation (FIG. 3a) and for improper operation (FIG. 3b).

FIG. 1 shows only by way of example a flow chart of one preferred configuration of the method according to the invention for monitoring the operation of an ozone-oxygen conversion means of a vehicle which has at least one catalytically coated heat exchanger 1 through or around which air flows and through which a heat exchange medium flows, this heat exchanger 1 having at least one DOR sensor 2 as the temperature sensor in order to detect the surface temperature on the heat exchanger 1, as is schematically shown in FIG. 2. FIG. 2 furthermore shows a thermostat 4 and an internal combustion engine 5 which are of conventional design.

The method begins with the start executed in step S1, with which in the case of a vehicle, for example, starting the engine is meant or the method is initiated directly after starting the engine by an electronic circuit.

In step S2 of the method in a first sequence of steps or number of steps:
  the temperature (tka) of the heat exchange medium at the outlet from the heat exchanger is detected using a temperature sensor 3 (FIG. 2) as a first time-referenced characteristic curve,
  the temperature (tprem) of the DOR sensor 2 as a second time-referenced characteristic curve is detected, and
  the detected temperature (tka) of the heat exchange medium is brought into a defined relation with the detected temperature (tprem) of the DOR sensor 2 to one another, this defined relation corresponding to the formation of a time-referenced area difference (Adiff) between the first and second characteristic curve. This takes place, as shown schematically in FIG. 2, in a control and/or adjustment means 6 as an electronic device for monitoring the operation of an ozone-oxygen conversion system to which the detected temperatures are transmitted by signal engineering (shown by the broken line).

These steps of the method can be summarized in the following formula:

$$A_{diff} = \int_0^T (tka - tprem)\, dt;$$

in one especially preferred configuration the method being initiated after reaching a defined or definable minimum temperature of the heat exchange medium at the outlet from the heat exchanger. This minimum temperature can begin starting at approximately 60 degrees Celsius using the method according to the invention compared to conventional methods which are ready for operation only after reaching the thermostat opening temperature of approximately 97.5 degrees Celsius.

In step S3 of the method, the time-referenced first area value Atka below the first time-referenced characteristic curve tka is determined. This step can be summarized in a mathematical formula which appears as follows:

$$A_{tka} = \int_0^T (tka)\, dt.$$

Steps S2 and S3 can be interchanged in their sequence in another preferred configuration or even more preferably can be executed in parallel.

In the next step S4 of the method, the determined first area value Atka is compared to a defined or definable first setpoint range. When the comparison result is negative, it means first of all that the integrated area of the temperature (tka) of the heat exchange medium at the outlet from the heat exchanger is not yet in the allowable temperature range which is valid for measurement results and for this reason branches to the start of the method. This loop is repeated until Atka is in the allowable temperature area range and is then continued to step S5 of the method.

In step S5 of the method a relation between the area difference (Adiff) of the two detected characteristic curves tka and tprem and the first area value is formed, the quotient $R_A$ of the two values being formed as the relation. The two area determinations take place preferably over an identical defined or definable time interval T. This is shown by the following formula:

$$R_A = \frac{A_{diff} = \int_0^T (tka - tprem)\, dt;}{A_{tka} = \int_0^T (tka)\, dt}.$$

The quotient can also be formed in another configuration of the method the other way around since it does not constitute a difference to be compared in this case to the corresponding inverse setpoint range.

The quotient $R_A$ obtained in this way is compared in the next step S6 of the method to a defined and/or definable second setpoint range which has, for example, an upper and a lower boundary value.

When the result of this comparison is negative, i.e., the determined quotient $R_A$ is outside its defined setpoint range, a fault is then recognized and is output in step S7.2 of the method.

If, conversely, the result of this comparison is positive, the determined quotient $R_A$ is within the defined setpoint range and in step 7.1 of the method a validity signal is generated which in further data processing (not shown) displays acceptance of the detected ozone-oxygen conversion.

With step S8 of the method the loop of the method can be closed. The next loop of the method can be initiated, for example, after a defined time interval. In another configuration of the method according to the invention, the method can also be routed directly to its start and can be continuously executed in an endless loop.

FIG. 3a shows a temperature-time diagram by way of example in which the temperature characteristic of the coolant is shown over time for a sample case. Additionally, the temperature characteristic tka of the heat exchange medium at the outlet from the heat exchanger over time is shown by the broken line. Furthermore, the temperature tprem of the DOR sensor is plotted in this diagram. The addition "original" in parentheses is intended to express that it is the temperature characteristic tprem of the correctly installed or arranged DOR sensor 2. Reference number 7 is used to designate a surface integral boundary curve below which the area region Atka is located which is bordered here only by way of example on its bottom by the time axis. Reference number 8 is finally used to designate a surface integral boundary curve below which the area region Adiff of an original or originally installed heat exchanger 1 is located.

FIG. 3b shows the same as FIG. 3a, only with the major difference that here, for example, a heat exchanger and/or a temperature sensor (DOR sensor) has not been correctly installed. In this case then, as a comparison of FIGS. 3a and 3b clearly shows by way of example, an altered temperature characteristic curve for the temperature tprem is obtained; this is characterized in FIG. 3b by the addition "tampering". As further shown by comparison of FIGS. 2a and 3b, this results in an identical area region Atka under the curve 7, but an altered larger area region for the area Adiff under characteristic curve 8'.

If then the quotient between the areas Adiff and Atka under characteristic curves 7 or 8, 8' for FIGS. 3a and 3b is formed, a different quotient value is obtained which in the case of the correct installation of FIG. 3a is much smaller than that of FIG. 3b. By corresponding stipulation of a respective quotient setpoint or a respective quotient threshold value, correct operation of an ozone-oxygen conversion means and/or of the installation site of the catalytically coated heat exchanger and/or of a DOR sensor can be easily deduced.

The invention claimed is:

1. A method for monitoring the operation of an ozone-oxygen conversion means, especially for monitoring of the installation site of a heat exchanger and/or a temperature sensor (DOR sensor) of an ozone-oxygen conversion means, for vehicles,
the ozone-oxygen conversion means having at least one catalytically coated heat exchanger through or around which air flows and through which a heat exchange medium flows, with at least one temperature sensor (DOR sensor) located on or in the heat exchanger for detecting the heat exchanger temperature, for detecting the surface temperature of the heat exchanger, for a defined time interval the temperature characteristics (tka, tprem) at the heat exchanger outlet and on the DOR sensor being determined and thus set into a relation to one another and/or to given comparison quantities and/or values such that evaluation of the operation of the ozone-oxygen conversion means and/or of the installation site of the catalytically coated heat exchanger and/or of the DOR sensor is carried out, comprising
a) detecting the temperature (tka) of the heat exchange medium at the outlet from the heat exchanger using a temperature sensor as a first time-referenced characteristic curve,
b) detecting the temperature (tprem) of the DOR sensor as a second time-referenced characteristic curve,
c) bringing the detected temperature (tka) of the heat exchange medium into a given relation with the detected temperature (tprem) of the DOR sensor to one another, this given relation corresponding to the formation of the time-referenced area difference (Adiff) between the first and second characteristic curves, and
d) determining the time-referenced area value (Atka) below the first time-referenced characteristic curve,
e) comparing the determined area value (Atka) to one of a defined and definable first setpoint range, and
f) generating a validity signal or invalidity signal depending on this such comparison, and
g) determining when the area value (Atka) is invalid, branching to the start of the process (S1) and
h) determining if the area value (Atka) is valid, a relation between the area difference (Adiff) of the two detected characteristic curves and the first area value is formed in order to detect a system fault or to generate a validity signal.

2. The method according to claim 1 including carrying out the first and second sequence of steps over one of a defined and definable time interval (T).

3. The method according to claim 1 including buffering the determined temperature values of at least one of the first and second time-referenced characteristic curve in an electronic device.

4. The method according to claim 1 including executing at least one of the process steps preferably using at least one coded instruction which are processed in an electronic device.

5. The method according to claim 1 including forming at least the first or second time-referenced characteristic curve (tka, tprem as a temperature gradient.

6. The method according to claim 1 including, in forming said one of to form the area value (Atka) and the area difference (Ada) between the first and second characteristic curves, using at least one electronic integrator.

7. The method according to claim 1 including to forming said one of the area value (Atka) and the area difference (Adiff) between the first and second characteristic curves, using one of a microprocessor-based integrator implemented by coded computation instructions and, a differentiator is used.

8. The method according to claim 1 including detecting the temperature (tka) of the heat exchange medium at the outlet from the heat exchanger, starting from the temperature of 60±5 degrees Celsius that is reached as a first time-referenced characteristic curve.

9. An electronic device for monitoring the operation of an ozone-oxygen conversion system with at least one means for execution of at least one step of the method according to claim 1.

10. The method according to claim 1, including forming a quotient ($R_A$) from the two values as the relation between the area difference (Adiff) and the first area value, the determined quotient ($R_A$) being compared to one of a defined and definable second setpoint range, if the determined quotient is invalid, a system fault is recognized or, if the determined quotient is valid, a validity signal is generated.

11. The method according to claim 10 including repeating after executing the third sequence of steps of the method.

12. A device for executing the method for monitoring the operation of an ozone-oxygen conversion means, comprising:
a catalytically coated heat exchanger through or around which air flows and through which a heat exchange medium flows, which has at least one temperature sensor (DOR sensor) for detecting the heat exchanger temperature,
at least one detection means, comparison means and evaluation means, by means of which for a defined time interval the temperature characteristics (tka, tprem) detected at the heat exchanger outlet and on the DOR sensor and can be set intone of a relation to one another, given comparison quantities, values for evaluation of the operation of the ozone-oxygen conversion means, of the installation site of the catalytically coated heat exchanger the DOR sensor, including
a temperature sensor for detecting the temperature (tka) of the heat exchange medium at the outlet from the heat exchanger,
at least one means for detecting a first time characteristic of the temperature (tka) of the heat exchange medium and a second time characteristic of the temperature of the DOR sensor,
at least one means for forming the area difference (Adiff) between the first and second characteristic curve and at least one means for forming the value of the area (Atka) below the first time characteristic of the temperature (tka) of the heat exchange medium.

13. The device according to claim 12 including at least one means for recording and keeping ready at least one of a defined, definable setpoint range of the area value (Atka) and one of a defined definable second setpoint range of the area quotient ($R_A$), at least one means for comparing the determined area value (Atka) to one of the defined definable setpoint range, and at least one means for forming a relation between the area difference (Adiff) of the two detected characteristic curves and the area value, including a quotient of the two values.

14. The device according to claim 12 including at least one of an electronic integrator and a differentiator for forming at least one of the area value (Atka) the area difference (Miff) between the first and second characteristic curve.

15. The device according to claim 12 including at least one of a microprocessor-based integrator implemented by coded computation instructions a differentiator for forming at least one of the area value (Atka) the area difference (Adiff) between the first and second characteristic curves.

16. The device according to claim 12 wherein the heat exchange medium is one of a water mixture, a coolant with or without antifreeze, oil and a gas mixture.

17. The device according claim 12 wherein the heat exchanger is one of an engine radiator, an oil cooler the condenser of an air conditioning system.

\* \* \* \* \*